United States Patent [19]

Mesland

[11] Patent Number: 5,093,260
[45] Date of Patent: Mar. 3, 1992

[54] PROCESS FOR CREATING, IN PARTICULAR IN THE EARTH GRAVITATIONAL FIELD CONDITIONS OF MICROGRAVITY FOR CELL CULTURE

[75] Inventor: Dick A.M. Mesland, Amstelveen, Netherlands

[73] Assignee: Agence Spatiale Europeenne, Paris, France

[21] Appl. No.: 562,421

[22] Filed: Aug. 1, 1990

Related U.S. Application Data

[62] Division of Ser. No. 195,662, May 8, 1988, abandoned.

[30] Foreign Application Priority Data

May 19, 1987 [FR] France ............................... 87 06999

[51] Int. Cl.⁵ ............................ C12N 5/02; C12N 1/00
[52] U.S. Cl. ............................... 435/240.25; 435/173; 435/240.46; 435/243; 435/284; 435/435; 435/286; 435/289
[58] Field of Search ............... 435/3, 173, 240.1, 240.2, 435/243, 240.22, 240.25, 240.46, 284–286, 287, 289, 291, 313, 316; 273/318, 323–325, 412; 124/3, 60, 70, 71, 73

[56] References Cited

U.S. PATENT DOCUMENTS

| | | | |
|---|---|---|---|
| 3,479,883 | 11/1969 | Cooper | 73/117.1 |
| 3,969,190 | 7/1976 | Hise et al. | 435/313 |
| 4,208,483 | 6/1980 | Lee | 435/284 |
| 4,270,383 | 6/1981 | Singer et al. | 73/82 |
| 4,431,182 | 2/1984 | Reynolds | 124/26 |

OTHER PUBLICATIONS

WPI Database Abstract of DE3320262.

Primary Examiner—David L. Lacey
Assistant Examiner—William H. Beisner
Attorney, Agent, or Firm—Oblon, Spivak, McClelland, Maier & Neustadt

[57] ABSTRACT

Process for creating on earth conditions for microgravity, in particular, for a suspension of cell culture.

The process comprises the following steps:
i) conferring to a system containing a suspension of cell culture an initial acceleration of appropriate intensity, obtained by submitting the system to an acceleration phase of appropriate duration, which acceleration is oriented towards a tilted direction with an equally appropriate angle with the vertical, so as to have this system in said gravitational field follow a ballistic trajectory after the acceleration phase and which takes place according to an ascending phase and a descending phase, whose respective durations define the total duration of the ballistic phase—i.e. of the phase during which the system follows the ballistic trajectory—the ratio between the duration of the ballistic phase and the duration of the acceleration phase being essentially equal to the ratio between the intensity of the system's initial acceleration and the intensity of the gravity acceleration;
ii) repeating step i) by again conferring to the system an initial acceleration at the end of each step i), that is to say at the end of each descending phase, this being appropriately repeated to cover a predetermined time period.

10 Claims, 2 Drawing Sheets

PROCESS FOR CREATING, IN PARTICULAR IN THE EARTH GRAVITATIONAL FIELD CONDITIONS OF MICROGRAVITY FOR CELL CULTURE

This application is a division of application Ser. No. 07/195,662, filed on May 18, 1988, now abandoned.

BACKGROUND OF THE INVENTION

This invention relates to a process for submitting to conditions of microgravity a system—more particularly made of a cell culture—normally submitted to the influence of a gravitational field.

The invention also relates to an apparatus for implementing this process.

Biological processes in space constitute a new discipline in the field of biotechnologies and possess an ever growing significance for industrialized countries, particularly for the preparation of pharmaceutical products.

As to the potential benefits to be gained from the culture, purification and transformation of animal and human cells, as well as from products obtained through these operations, under microgravity conditions, these have been and will be assessed during a special research program carried out by NASA, ESA, industrial Companies and Research Laboratories on board SPACE-LAB.

In particular, industry's attention is principally focused on the development of (protein, cell, &c) separation techniques, and culture techniques for cells such as microorganisms or animal and human cells.

Heretofore experiments carried out on animal and human cells have shown, unambiguously, that living cells are sensitive to gravity, and that under microgravity conditions their rate of cell division (proliferation) is altered by comparison with the phenomenon taking place in a gravitational field.

Cells with motility, such as *Paramecium aurelia*, possess, under microgravity conditions, a higher proliferation rate but a lower amount of synthesized proteins, whereas cells without motility, such as lymphocytes, possess, under microgravity conditions, a lower proliferation rate and a higher amount of synthesized interferon.

It will thus be readily understood that a reduced proliferation, combined with a smaller energy consumption (the latter resulting from the fact that the cells do not need to make any effort against gravity), could open the way to an increased production, under microgravity conditions, of cell products, notably necessary to the pharmaceutical industry.

Therefore, it is also understood that, if it were possible to produce microgravity conditions in plants submitted to the earth's gravitational field, scientific research as well as industrial applications of cell culture techniques under these conditions would be notably simplified.

But as concerns submitting a system, which to start with may be any system, to microgravity conditions, one must note that these conditions can only be obtained if said system is in a state of free fall, that is only if the gravity force is not balanced by another force (whatever the nature of the balancing force).

To this time different methods are known for submitting an unspecified system to conditions of microgravity during a given period; in particular the following system is known:

a) having the system fall from the top of a tower called zero gravity tower;

b) putting the system inside an aeroplane following the trajectory of a ballistic flight (see paper in ESA Bulletin, n° 42, May 1986, Parabolic Aircraft Flights—An effective Tool in preparing Microgravity Experiments').

c) putting the system in a missile following the trajectory of a ballistic flight, the greater part of this trajectory being situated outside the atmosphere;

d) putting the system into orbit around the earth.

As to the time interval of microgravity conditions obtained with the first three methods, a)-c), this is about 5 seconds, 30 seconds, and 10 minutes, respectively.

However only the fourth method mentioned under d) ensures as a rule continued microgravity conditions.

Knowing that cell cultures generally require incubation periods from several days to several weeks, the fourth method is clearly the only one with which this culture can be made under actual microgravity conditions during the whole incubation period.

To this time only one machine is known to be able, only up to a point, to simulate continuous duration microgravity conditions. This is CLINOSTAT, whose principle relies on the rotation of plants or cells around a horizontal axis so as to modify continuously the direction of the gravity of the gravity acceleration vector and to 'disorientate' them, in other words to make them unable to feel the influence of a gravitational field acting in a precise direction.

Two variants of this machine have been used in basic research:

1) Low speed rotation CLINOSTAT, largely used for studying the behaviour of plants under microgravity conditions (see Proc. 2nd European Symposium on Life Sciences Research in Space, Porz Wahn, Germany 4-6 June 1984 (ESA SP-212-August 1984)), and 2) High speed rotation CLINOSTAT, recently used for studying the behaviour of cells and small organisms under microgravity conditions (see publication mentioned under 1 above as well as Proceedings of a workshop on Space Biology, Cologne, Germany 9-11 Mar. 1983 (ESA SP-206, May 1983)).

However these machines present two major drawbacks:

a') they do not ensure actual microgravity conditions, b') when they are used for studying cell behaviour, the rotating tube which makes up each type of machine must possess a very small diameter in order to minimize centrifugal acceleration (the latter naturally acting in a continuous manner).

Apart from the fact that results obtained with a CLINOSTAT often differ widely from results obtained during space missions (see particularly The Physiologist, Vol. 28, No 6, Suppl., 1985, and The Physiologist, Vol. 28, No 6, Suppl., 1985), which is probably due to the drawback mentioned under a'), it must be stressed that the constraint mentioned under b' (and representing another CLINOSTAT drawback) deprives this machine from the necessary experimental flexibility and prevents some of its large scale applications.

SUMMARY OF THE INVENTION

A first object of this invention is to provide a process for submitting to microgravity conditions a system, more particularly made up of cell cultures, and normally submitted to the influence of a gravitational field, more closely meeting practical necessities than heretofore known methods.

Another object of this invention is to provide an apparatus for implementing this process.

This invention refers to a process for submitting to microgravity conditions a system, more particularly made up of a suspension of cell culture, and normally submitted to the influence of a gravitational field, which is defined by its gravity acceleration vector, of given intensity, and which is more particularly made up by the earth's gravitational field, this process being characterized in that it comprises the following steps:

i) conferring to said system an initial acceleration of appropriate intensity, which is obtained when one submits the system to an acceleration phase of appropriate duration, this acceleration being oriented towards a tilted direction with an equally appropriate angle with the vertical, so as to have this system in said gravitational field follow a ballistic trajectory after the acceleration phase and which takes place according to an ascending phase and a descending phase, whose respective durations define the total duration of the ballistic phase—i.e. of the phase during which the system follows said ballistic trajectory—the ratio between the duration of the ballistic phase and the duration of the acceleration phase being identical to the ratio between the intensity of the system's initial acceleration and the intensity of the gravity acceleration;

ii) repeating step i) by again conferring to the system an initial acceleration at the end of each step i), that is to say at the end of each descending phase, this being appropriately repeated to cover a predetermined time period.

According to a preferred embodiment of the inventive process as applied to a system made up by a suspension of cell culture, the duration of step ii) is at least equal to the cells' incubation period; and the ratio between the intensity of the system's initial acceleration and the intensity of the gravity acceleration is at least equal to n, with n at least equal to 1, so as to obtain microgravity conditions for a period of time at least equal to 10. n % of the corresponding incubation period, taking into account the insensivity of cells in suspension to short duration accelerations.

According to another preferred embodiment of the inventive process, the angle formed with the vertical by the direction of initial acceleration conferred to said system equals zero, in other words said trajectory is vertical.

According to an advantageous embodiment of the inventive process, the initial acceleration conferred to said system is obtained with compressed air.

According to an advantageous variant of this embodiment, the initial acceleration conferred to said system is obtained with an electromagnetic force.

This invention also refers to an apparatus for implementing the inventive process, characterized in that it comprises a combination of:

i*) a means for containing (therefore a receptacle for) a system to be submitted to microgravity conditions;

ii*) a means for submitting in a gravitational field, in a repetitive (and therefore periodical) manner, said system to an acceleration phase of appropriate duration to confer to this system an initial acceleration, having it thus follow a ballistic trajectory after the acceleration phase and taking place according to a descending phase and an ascending phase whose respective durations define the total duration of the ballistic phase—i.e. of the phase during which the system follows said ballistic trajectory—the ratio between the duration of the ballistic phase and the duration of the acceleration phase being essentially equal to the ratio between the intensity of the initial acceleration conferred to the system and the intensity of the gravity acceleration;

iii*) means for detecting the direction in which the system moves when it is in the ascending and descending phases of each ballistic trajectory, which detecting means trigger off means ii*) at the end of each descending phase.

According to a first advantageous embodiment of the inventive apparatus, the means for repeatedly (periodically) conferring an initial acceleration to said system comprise a compressed air device directed towards the system by a vertically oriented nozzle (so as to have the system follow a vertical trajectory) and whose flow rate is monitored by a valve, said valve being driven—at the end of each descending phase—by said detecting means and being kept open during enough time for said receptacle to obtain the required acceleration.

According to a preferred arrangement of this first embodiment the detecting means comprise two gauges for determining in which direction moves the receptacle containing said system, consisting of two separate light source/phototransistor devices arranged in a vertical line, the light sources and phototransistors being placed on each side of the receptacle's vertical trajectory, so as to detect a first passage of the receptacle when it is in the ascending phase of each trajectory, and later its second passage when it is in the descending phase immediately following, the detection of the second passage triggering off a temporizer during a time interval equal to the time elapsed between this second passage and the end of the descending phase, at which time a device for controlling the valve (electrovalve) for monitoring the flow rate of compressed air is triggered off to open this valve and keep it open during the necessary time to give the receptacle the required initial acceleration.

According to another advantageous disposition of the inventive apparatus, the means for conferring said initial acceleration to the receptacle cooperate with means for receiving the receptacle at the end of the descending phase and for vertically guiding this receptacle under the influence of the compressed air flow, comprising a seat for receiving the receptacle, centrally perforated to allow the passage of compressed air, as well as springs for supporting this seat, symetrically arranged around the vertical trajectory and secured to a supporting frame for said direction gauges.

According to a second advantageous embodiment of the inventive apparatus, the means for repeatedly (periodically) conferring an initial acceleration to said system comprise an electromagnet acting upon a rod moving in line with the vertical trajectory followed by the receptacle containing said system.

According to an advantageous arrangement of this second embodiment, the detection means comprise a combination of:

a seat secured to the upper end of the moving rod and intended for receiving the receptacle at the end of the descending phase;

a spring, also in line with the vertical trajectory, like the electromagnet's moving rod, and connected to the lower end of this rod, the lower end of said spring being fixed to the apparatus's frame.

BRIEF DESCRIPTION OF THE DRAWINGS

Apart from the above, the invention also comprises other features which will become evident from the following description.

The invention will be better understood with the help of the following complementary description, referring to the appended drawings, in which.

It must however be understood that these drawings, and the corresponding descriptive parts, are only given as illustrations of the object of the invention and are in no way limitative of the scope of the invention.

DESCRIPTION OF THE PREFERRED EMBODIMENTS

This invention relates to a process for submitting a system,—and more particularly a suspension of cell culture, normally submitted to the influence of a gravitational field—, to microgravity conditions according to the terms illustrated in the preceding dispositions.

On the basis of these dispositions it appears clearly that, although the microgravity conditions created with the help of the inventive process are discontinuous (or intermittent)—as the ballistic phase is necessarily preceded by an acceleration phase—one can theoretically approach at will micro-gravity conditions having a substantially continuous character, notably during the whole incubation period, and all the more since the cells in suspension are substantially insensitive to short duration accelerations: in effect, under these conditions, one can expect that the short duration periods corresponding to the acceleration phase do not eliminate the effects of microgravity created during the ballistic phase, so that one can say, in practice, that the inventive process can create microgravity conditions substantially during the whole incubation period. As a demonstration of the cells' insensitivity to short duration accelerations one can cite the condition according to which living cells can easily be submitted to centrifugal accelerations representing several hundred times the earth's gravity acceleration per minute, without experiencing measurable effects in practice.

Figure 1:
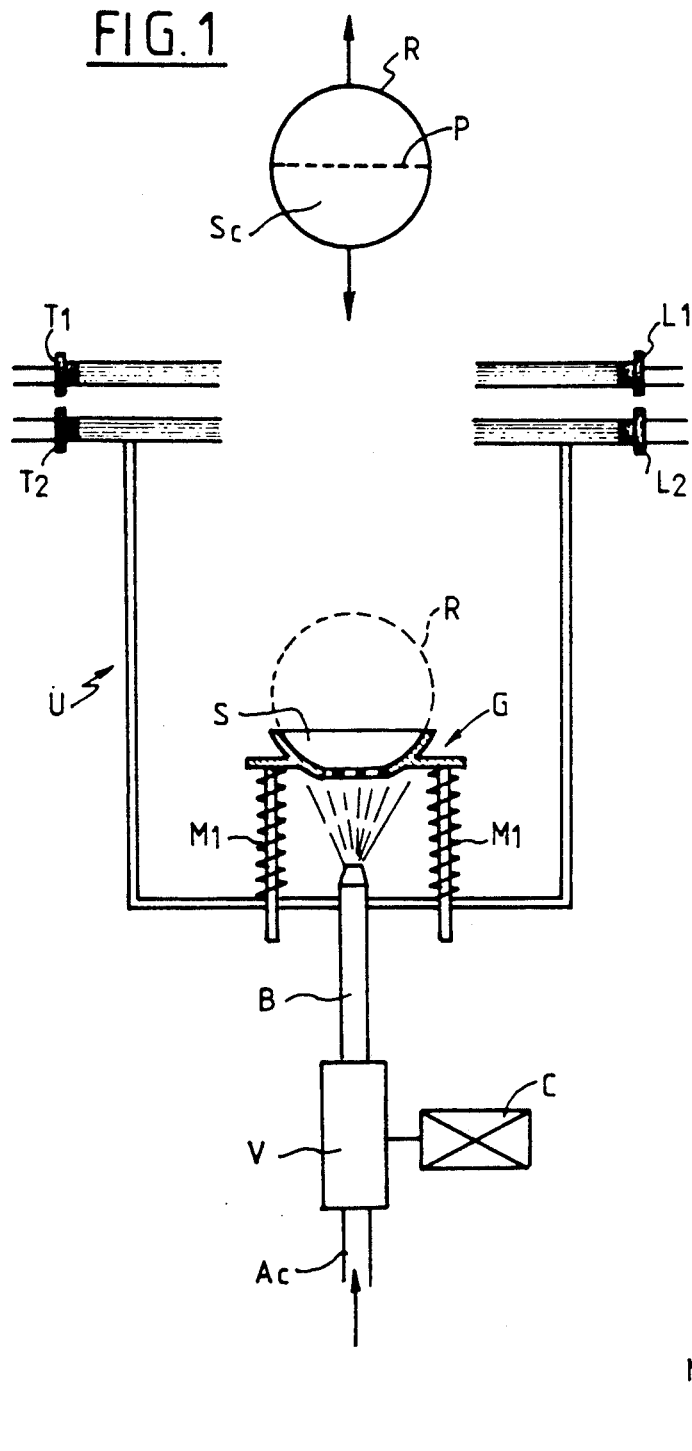
FIG. 1 is a diagrammatic illustration of a first embodiment of the inventive apparatus for implementing the process object of this invention.

It must be made clear, if need be, that the microgravity conditions begin at the end of the acceleration (or propulsion) phase and last during the whole ballistic phase: on this point one can profitably refer in particular to the paper quoted under b), page 2, and notably to FIG. 1, from which one can deduce that microgravity (or 'reduced gravity') conditions are felt in an ascending portion and in the immediately following descending portion of the ballistic trajectory.

The preceding considerations substantiate the applicant's opinion according to which the process for creating microgravity conditions according to the invention is considered to be particularly applicable, in a specific manner, to cell culture studies.

A typical value of the length of time needed by the system to follow each acceleration phase and the corresponding ballistic phase approximately equals 1 second.

Figure 2:
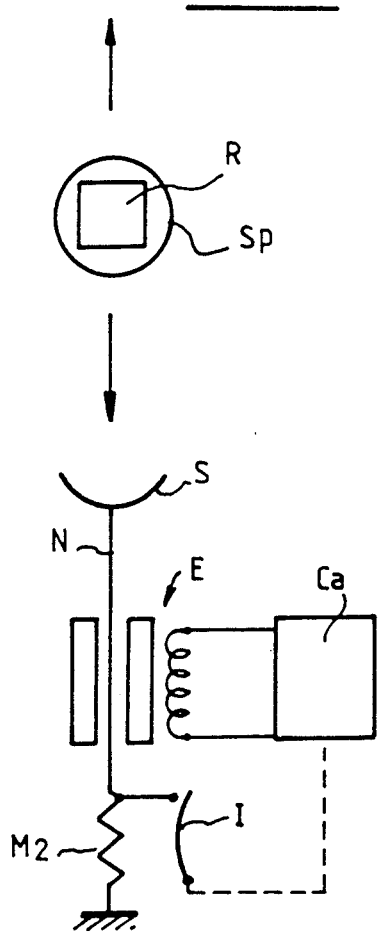
FIG. 2 is another diagrammatic illustration of another embodiment of the apparatus for implementing the inventive process.

Different kinds of apparatus can be devised for implementing the inventive process, two non limiting variants of these being represented in FIGS. 1 and 2.

The apparatus in FIG. 1 uses a compressed air device, the air coming from a line Ac to confer to a receptacle R, containing the suspension of cell culture Sc, the required initial acceleration in order to eject the receptacle at a height which is a function of this acceleration, i.e. to have the receptacle follow each ascending phase of its trajectory preceding the corresponding descending phase.

The flow rate of compressed air contributed by nozzle B is maintained during the necessary time for receptacle R to obtain the required acceleration and is monitored by valve V.

Detection means D (see also FIG. 3) of the direction of motion ofo receptacle R comprise two photoelectric direction gauges, each made up of a light source—L1, L2—and a phototransistor—T1 and T2, respectively.

Detector D cooperates with a temporizer Tf (in the sense which will be described below) in order to drive the controlling device C of electrovalve V, which is kept open during the necessary time for conferring an appropriate initial acceleration to receptacle R under the impulse of an appropriate flow of compressed air flowing through nozzle B.

More precisely, when receptacle R is at the lowest point in its trajectory (that is to say when it is in the position corresponding to the end of a descending phase), the compressed air flowing out of nozzle B confers to the cell culture an initial acceleration allowing it to follow the next trajectory's ascending phase, which is itself followed by the corresponding descending phase as soon as the receptacle has reached the highest point (apex) of this trajectory, that is to say as soon as it has reached the end of the ascending phase.

Figure 4:
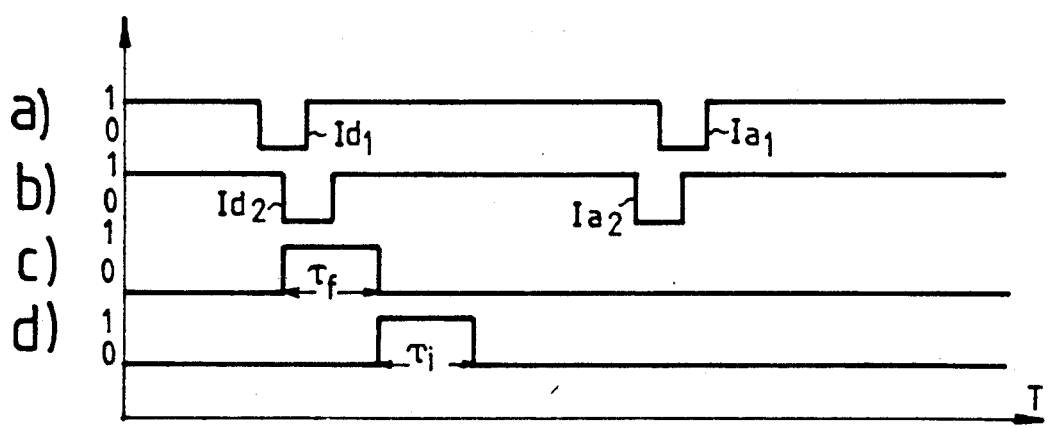
FIG. 4 shows a diagram presenting, as a function of time, the different stages of the electronic detection of the direction along which is driven the system moving along said ballistic trajectory.

The instants at which the receptacle R passes through the positions occupied by the two photoelectric gauges, L1/T1 and L2/T2, when the receptacle is in the descending phase of its trajectory, are detected by these two gauges, one after the other, as impulses Id1 and Id2 (see diagrams a) and b) in FIG. 4 concerning direction gauges L1/T1 and L2/T2, respectively).

These points are recorded by detecting means D, so that passing through the position occupied by gauge L2/T2 triggers off temporizer Tf during time interval $\tau_f$ (see diagram C) in FIG. 4) between this point and the end of the descending phase, when the controlling device C is driven to open electrovalve V during the necessary time interval $\tau_i$ to confer to receptacle R the required initial acceleration (see diagram d) of FIG. 4).

When receptacle R is in the ascending phase of the trajectory it follows under the influence of compressed air, it intercepts the light beams emitted by sources L2 and L1 in this order, this first passage being detected as impulses Ia2 and Ia1 (see again diagrams a) and b) in FIG. 4) and recorded as such, that is to say as detecting the direction of motion of the receptacle when moving upward (or following the ascending phase of its trajectory), the second passage of receptacle R being detected and recorded as detecting the direction of motion of the receptacle when moving downward (or following the descending phase of its trajectory), only this second detection allowing to trigger off the temporizer and thus the electrovalve's controlling device.

Figure 3:
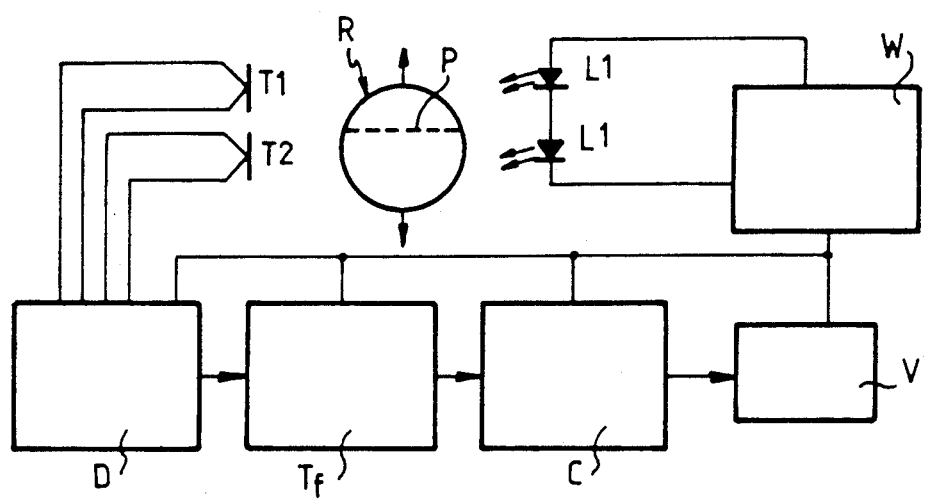
FIG. 3 shows a block diagram corresponding to the electronic detection means for the direction of (ascending and descending) motion of a system to be submitted to microgravity conditions, when it moves along each of the ballistic trajectories repeatedly conferred to the system by the apparatus presented in FIG. 1.

The electric power supply is given by block W in FIG. 3.

The apparatus in FIG. 1 can comprise receiving and guiding means G for receptacle R at the end of the descending phase, including site S for the receptacle, which is centrally perforated to allow the passage of compressed air and which is supported by springs M1 symetrically arranged around the ascending (vertical) trajectory followed by the receptacle and secured to a frame, U, for supporting direction gauges, L1/T2 and L2/T2.

FIG. 2 shows another embodiment of an apparatus for implementing the inventive process. This second apparatus differs from the apparatus presented in FIG. 1 essentially as concerns means for conferring the required initial acceleration to the cell culture and the detecting means.

More precisely, in this second apparatus, the means for conferring an initial acceleration, at the end of each descending phase, are comprised of an electromagnet, E, driving a mobile rod, N, in line with the (vertical) ascending trajectory followed by receptacle R.

To the upper end of the core is secured a seat, S, for receiving receptacle R at the end of the descending phase, whereas its lower end is linked with a spring, M2, equally in line with the above-mentioned ascending (vertical) trajectory.

A switch, I, being part of an activating circuit, Ca, for electromagnet E, is driven by the impact of receptacle R on seat S at the end of descending phase, which allows to drive the above-mentioned electromagnet and to give, through vertical rod N, the necessary force to confer receptacle R the required initial acceleration so that it can follow the prescribed trajectory.

In each case one can use for containing the suspension of cell culture a receptacle which may be of any type, but which is preferably spherical and made of a biocompatible material, such a 'TEFLON' (a registered trade mark), having a comparatively reduced weight so as to be suitable within the compressed air apparatus illustrated in FIG. 1. Nothing however prevents the use of a rigid material, having, as already said, any shape, and made of a biocompatible material but placed inside an elastic sphere, Sp: naturally in this case more important forces are required to launch the receptacle containing the suspension of cell culture, which means that this second kind of receptacle may be used within the apparatus illustrated in FIG. 2.

Whatever the (spherical, parallelepipedic, & c) of the receptacle for the suspension of cell culture, a septum comprised of a membrane, P, permeable to air, is placed in the receptacle, so as to separate the cell culture from the air.

Moreover, in each case, the apparatus used for implementing the inventive process should submit the receptacle containing the cell culture (and preferably automatically) to slow displacements, so as to continually modify the orientation of the acceleration vector to which this receptacle is submitted during the above-mentioned ascending phase, in order to avoid a possible integration of gravity-linked effects.

Furthermore, although in the preceding examples it is supposed that initial acceleration conferred to the cell culture at the end of each descending phase (and therefore at the beginning of the next ascending phase) is always the same, nothing prevents one from modifying the initial acceleration, for instance by stages, during transitions from one trajectory to another.

What is claimed is:

1. A process for stimulating growth of a cell culture, comprising the steps of:
    (a) placing a system made up of a suspension of cell culture in a container, said culture having a given incubation period and normally under the influence of the earth's gravitational field;
    (b) accelerating said container during an acceleration phase of a short duration to confer to the system an initial acceleration of a given intensity;
    (c) orienting the acceleration at an angle to the vertical, causing said container to follow a ballistic trajectory during a ballistic phase, said ballistic phase including an ascending phase and a descending plase whose respective durations define a total duration of the ballistic phase;
    (d) controlling the duration of the acceleration phase and the intensity of the initial acceleration so that the ratio between the duration of the ballistic phase and the duration of the acceleration phase is essentially equal to the ratio between the intensity of the initial acceleration and the acceleration due to gravity;
    (e) creating substantially continuous microgravity conditions as a result of said accelerating in the cell culture during at least said incubation period, while ensuring the cells insensitivity to the acceleration phase, thereby stimulating growth of said cell culture in the same manner as zero gravity conditions;
    (f) detecting a direction of movement along which the system moves when it is in the ascending and descending phases of the ballistic trajectory; and
    (g) repeating, in response to said detecting, steps (b) through (f) over a predetermined period of time.

2. Process according to claim 1 wherein the predetermined period of time of step (g) is at least equal to said incubation period; and the ratio between the intensity of the initial acceleration and the acceleration due to gravity is at least equal to n, with n at least equal to 1, so as to obtain microgravity conditions for a period of time at least equal to 10. n % of the incubation period.

3. Process according to claim 2 or 1 wherein said trajectory is vertical.

4. Process according to claim 2 or 1 wherein the initial acceleration conferred to said system is obtained with an electromagnetic force.

5. A process according to claim 4, wherein the electromagnetic force is applied by an electromagnet acting upon a vertically oriented mobile rod, so that the system follows a vertical trajectory.

6. A process according to claim 5, wherein the step of detecting includes a seat secured to an upper end of the mobile rod and a spring in line with the vertical trajectory connected to a lower end of said rod, a lower end of said spring being secured to a supporting frame.

7. Process according to claim 2 or 1, wherein the initial acceleration conferred to said system is obtained with compressed air.

8. The process according to claim 7, wherein the initial acceleration is caused by a compressed air device directed toward the container by a vertically oriented nozzle, so that the system follows a vertical trajectory, with the flow rate of the compressed air being monitored by a valve, the valve being driven at the end of each descending phase in response to the step of detecting and being kept open long enough to confer to the container the initial acceleration.

9. A process according to claim 8, wherein the step of detecting utilizes two vertically spaced gauges for determining the direction of movement of the system, each of said gauges including a light source device and a phototransistor device which are positioned on each side of the vertical trajectory, so as to detect a first passage of the container when it is in the ascending phase, and the detection of a second passage, triggering a temporizer for a time interval equal to the time between the second passage and the end of the descending phase, at which time the valve is opened and kept open for a time interval necessary to confer the initial acceleration to the container.

10. The method according to claim 9, wherein the container is received at the end of the descending phase and vertically guided under the flow of compressed air by a receiver which includes a centrally perforated seat to allow the passage of compressed air and springs for supporting the seat which are symmetrically arranged with respect to the vertical trajectory and secured to a supporting frame for said gauges.

* * * * *